JOHN G. WILLIAMS
INVENTOR.
BY Daniel H. Bobis
Atty

April 16, 1963     J. G. WILLIAMS     3,085,808
MECHANICAL SEAL WITH CONTROLLED LEAKAGE
Filed May 17, 1960     4 Sheets-Sheet 2
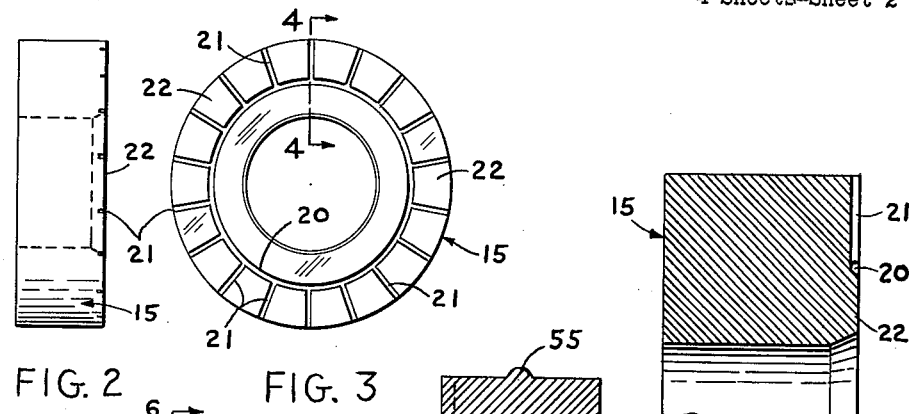
FIG. 2     FIG. 3     FIG. 4
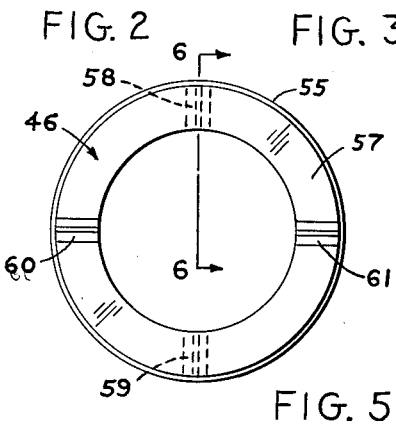 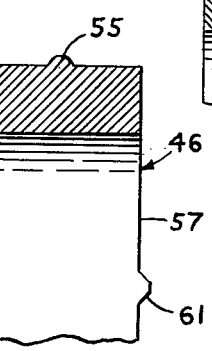
FIG. 5     FIG. 6
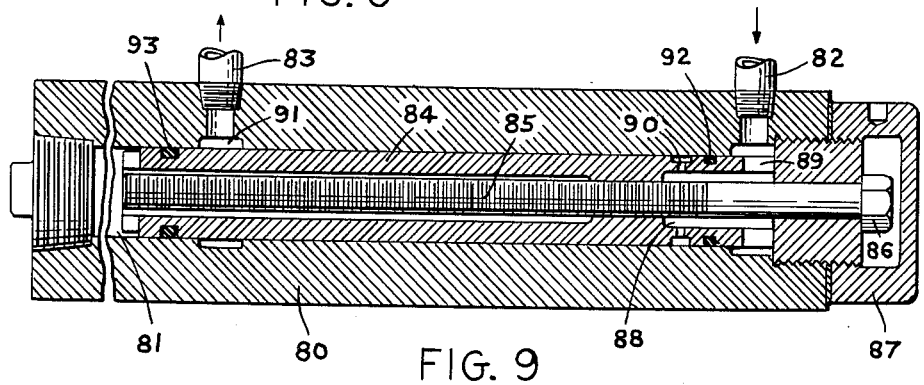
FIG. 9
JOHN G. WILLIAMS
*INVENTOR.*
BY Daniel H. Bobis
*Atty*

April 16, 1963  J. G. WILLIAMS  3,085,808
MECHANICAL SEAL WITH CONTROLLED LEAKAGE
Filed May 17, 1960  4 Sheets-Sheet 4

JOHN G. WILLIAMS
*INVENTOR.*

BY Daniel H. Bobis
Atty.

United States Patent Office 3,085,808
Patented Apr. 16, 1963

3,085,808
MECHANICAL SEAL WITH CONTROLLED LEAKAGE
John G. Williams, Springfield, N.J., assignor to Worthington Corporation, Harrison, N.J., a corporation of Delaware
Filed May 17, 1960, Ser. No. 29,648
8 Claims. (Cl. 277—3)

This invention relates generally to seals for rotatable shafts disposed to extend into a region of very high pressure and more particularly to a controlled or limited leakage type mechanical seal for such shafts.

In high pressure fluid circulating systems such as a boiler feed system in a power station, the use of conventional drives requires a shaft extending from the region of atmospheric pressure where it is coupled to the prime mover into a region of very high fluid pressure.

This presents a severe seal problem because of leakage across the shaft. To avoid this problem various prior art devices such as canned rotor motors and wet pumps have been utilized.

However, the economic and engineering advantages of using conventional drives are of sufficient importance to warrant consideration of seal devices which either stop or limit such leakage across the shaft. Thus, various controlled leakage type and face type mechanical seals have been developed and are known in the prior art.

The controlled leakage type seal attempts to establish a flow orifice to control the leakage. Unfortunately at pressures in excess of 400 p.s.i. and more particularly at pressure in excess of 1000 p.s.i., which is the area to which the present invention is particularly applicable leakage becomes excessive, and two difficulties develop, as follows:

(1) An auxiliary pumping arrangement is required for the seal itself, and
(2) The efficiency of the circulating system in which the seal is being utilized is adversely affected by the leakage.

In conventional face type mechanical seals applied to higher pressure sealing wherein a rotatable element and a stationary element form a coacting sealing face therebetween, in order to secure the attempted zero leakage condition the seal must be exactly balanced to avoid excessive loading between the rotatable and stationary elements, as the fluid film thickness between these elements is so small excessive loading will cause physical contact resulting in wear and finally mechanical breakdown.

To illustrate the problem, investigation and analysis of conventional face type mechanical seals which include a rotatable element and a stationary element wherein one of the elements is self-lubricating, shows that the operation of such seals depends on the balancing of forces acting across the seal face so that a continuous fluid film thickness will be present between the rotating element and the stationary element. However, this fluid film thickness must be maintained at approximately 50×10⁻⁶ of an inch if the seal is to produce the desired result and this is where the problem arises because the inherent physical character of the materials used and the inability to maintain manufacturing tolerances provide seals in which the balancing of the forces cannot maintain this operative condition and as a result in the presently known seals, early mechanical failure can be expected.

The present invention overcomes this problem by providing a mechanical face type seal which includes a rotatable element and a stationary element which latter element is mounted in a self-adjusting follower assembly arrangement relative the rotatable member to react to differential pressure forces established responsive to variations in the predetermined film thickness between the rotatable element and stationary element preset by means of an external orifice of predetermined size to control and limit the leakage past the seal.

Accordingly, it is an object of the present invention to provide a controlled or limited leakage type seal for a rotatable shaft wherein the leakage between the rotatable and stationary elements of the seal is established to provide a predetermined fluid film thickness.

It is another object of the present invention to provide a controlled or limited leakage type seal for a rotatable shaft having an external orifice to set the desired fluid film thickness for optimum and effective operation.

This and other objects and advantages of the invention will become evident from the following description with reference to the accompanying drawings in which:

FIGURE 2 is a side elevation of the rotatable runner element of the seal.

FIGURE 3 is a front view of the rotatable element of the seal.

FIGURE 4 is a section taken on line 4—4 of FIGURE 3.

FIGURE 5 is a front view of the gimbal element.

FIGURE 6 is a view taken on line 6—6 of FIGURE 2.

FIGURE 9 is a cross-section of one form of adjustable orifice for the circuit shown in FIGURE 8.

Figure 1:
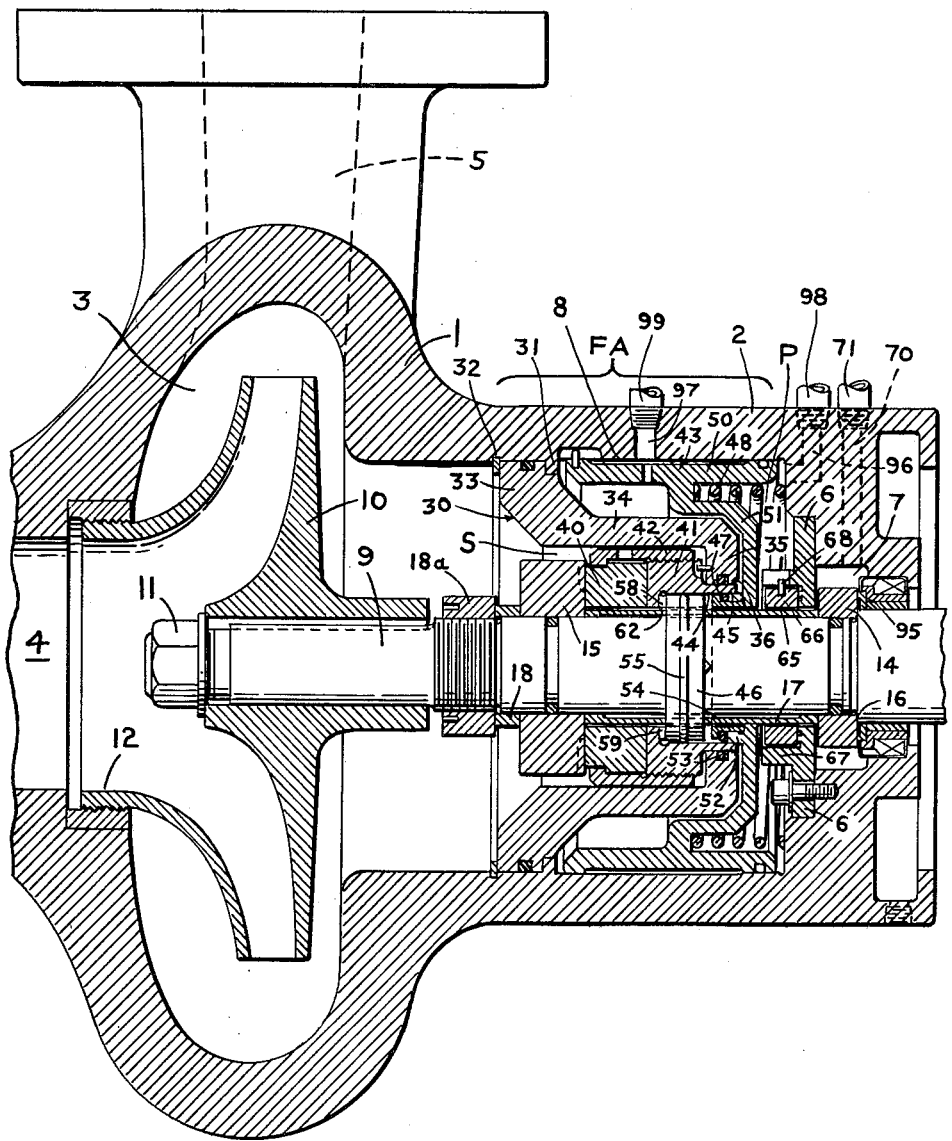
FIGURE 1 shows a cross-section of the invention as applied to a circulating pump in a high pressure fluid system.

Referring to the drawings, FIGURE 1 shows a pump for a high pressure fluid circulating system having a casing 1 and a seal housing 2 connected or formed integrally therewith.

The casing forms an impeller chamber 3 having a centrally disposed suction inlet 4 and a discharge outlet 5 communicating with the periphery of the chamber.

The seal housing 2 is a hollow cylindrical shape and is so arranged that the tranverse member 6 forms an outer seal chamber 7 and an inner seal chamber 8, which latter chamber communicates with and receives fluid from the impeller chamber as hereinafter described.

A shaft 9 extends through the outer seal chamber 7, the partition 6 and the inner seal chamber 8 into the impeller chamber 3 where it receives the impeller 10 on its inner end by any suitable means such as the threaded member 11.

If it is assumed that the fluid being pumped is at high static pressure at all times and fills the impeller chamber 3, then when the shaft 9 is rotated by any suitable type of prime mover (not shown), fluid passed from the suction inlet 4 to the suction eye 12 of the impeller 10 through the impeller 10 to the impeller chamber 3 and thence to the discharge outlet 5. Since this operation is well known in the art it is not more fully described.

Since the shaft will enter from a point at atmospheric pressure or at least relatively lower pressure than the pressure of the fluid in the impeller chamber 3, leakage will occur across the shaft from the zone of high pressure fluid, by reason of the differential pressure which exists. This leakage with the prior art sealing devices has been so excessive as to render prior seals relatively ineffectual.

In the present invention the structure now to be described relies on controlling or limiting the leakage rather than attempting to obtain a zero leakage condition.

The seal is a combination arrangement wherein the pressure is broken down by a first high pressure mechanical seal to a pressure which can be taken care of by a second standard-known type of conventional low pressure seal, i.e., one that operates effectively at pressure under 400 p.s.i.

The seals are disposed relative each other so that the low pressure mechanical seal falls in the outer seal chamber 7 and the high pressure mechanical seal falls in the inner seal chamber 8.

In order to accomplish this the rotatable elements or runners 14 and 15 of the respective low and high pressure mechanical seals are mounted to the shaft 9 in the following manner. The low pressure or outer runner 14 abuts the shoulder 16 provided on the shaft, and a sleeve 17 about the shaft in turn abuts the opposite face of the runner 14 and acts as a spacer against which the high pressure or inner runner 15 can be fixedly positioned as by a second spacer 18 and threaded element 18a disposed about the shaft which acts to lock the entire assembly in the desired spatial relationship.

*High Pressure Mechanical Seal*

Figure 10:
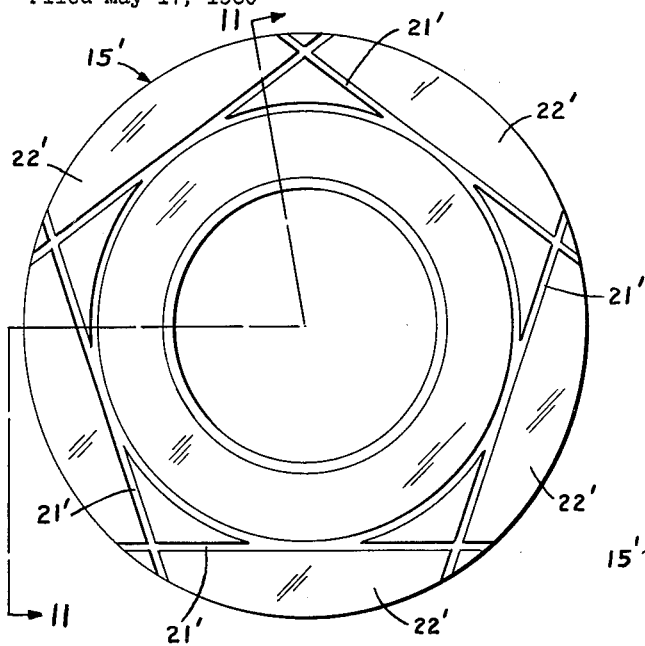
FIGURE 10 is a front view of a modified type of rotatable runner element.
Figure 11:
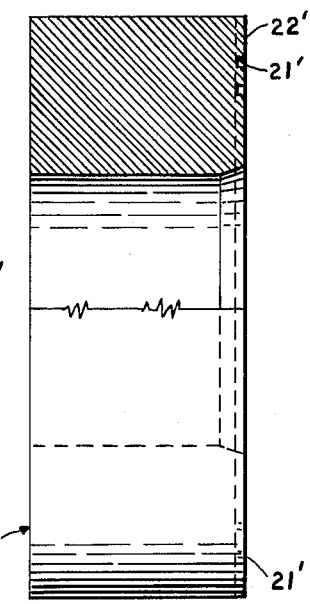
FIGURE 11 is a side view of the modified type of rotatable runner element shown in FIGURE 10.

The high pressure or inner runner 15 is an annular member as shown in FIGURES 2, 3 and 4. The inner and outer faces of the runner 15 are machined to the finest finish and tolerances obtainable. Midway between the inner and outer periphery of this member an annular groove 20 is cut and from this groove a plurality of radiating grooves 21 are milled to provide the pads 22 therebetween. These pads form surfaces which have a distinct function as is well known to those skilled in the art. However, while this type face is shown on the annular element illustrated, such face may consist of a plurality of milled slots 21' as shown in FIGURE 10 of the drawings illustrating a modified type runner 15'. Thus, milled slots 21' form corresponding pads as at 22' which have been formed to produce the same results. Either runner 15 or 15' illustrated may be utilized in the present invention.

It is believed clear from the above that great care is taken in the assembling of the respective outer and inner runners 14 and 15, and with respect to the inner runner 15 that the construction is made with the highest order of precision. This is important to produce the desired type of accurate seal required.

Unfortunately, however, the associated parts of the assembly which mount the runners 14 and 15 to the shaft and, the shaft itself although also made with the highest order of precision are nonetheless mechanical parts and the machining variation plus the distortion produced when the member 18a is drawn up to position the runners 14 and 15 will cause sufficient deviations in the position of the runners 14 and 15 that the contacting or seal faces of the runners will not stay in absolute parallelism but will "run out" in an extent particularly important with the high pressure or inner runner 15 of about $600 \times 10^{-6}$ of an inch for a 2-inch shaft.

To meet this problem which is important only at the high pressure point in the system because this variation in movement will affect the fluid film thickness, there is provided a self-adjusting follower assembly generally designated FA which is mounted in the inner seal chamber 8 about the shaft at a point to permit coaction between the follower assembly and the inner runner 15 to correct this and other defects which cause excessive leakage between the rotatable member or inner runner 15 and the stationary portion of the high pressure mechanical seal.

Accordingly, referring to FIGURE 1 we find that in order to mount the self-adjusting follower assembly FA in position, a cylindrical member 30 is connected to the wall of the inner seal chamber 8 at a point in the approximate plane of the rotatable member or inner runner 15, in any suitable manner by abutting relationships with the annular shoulder 31 and snap ring 32.

The cylindrical member 30 is connected by an annular base 33. Continuous therewith and extending axially outward a cylindrical body portion 34 is in turn provided with an inturned annular flange 35 at the end remote from the annular base 33, the cylindrical member 30 serves to divide the inner seal chamber 8 into a stationary seal section S and a piston section P which sections receive the various associated parts making up the self-adjusting follower assembly FA.

The inturned annular flange 35 has its inner periphery a spaced distance from the shaft 9 and is rounded as at 36 to serve as one of the pivoting points for the self-adjusting follower assembly FA.

The parts of the self-adjusting follower assembly coact to allow the stationary seal or nose-piece 40 to slide axially inward and outward, to move horizontally and vertically and to swivel sufficiently to follow the variations in the movement of the seal face of the runner 15. Furthermore, the elements coact to provide a seal between the seal section S and the piston section P of the inner seal chamber 8.

Thus, the stationary nose-piece or seal member 40 is an annular member made of any suitable self-lubricating material. It is mounted in a holder assembly comprising a back-up adapter seal 41 and a nose-piece clamping member 42 to comprise the stationary seal means. The clamping member 42 is disposed to hold the nose-piece 40 and to be threaded into the periphery of the adapter seal 41 to hold the nose-piece 40 in the holder assembly. The backup adapter seal 41 serves to position the nose-piece 40 for axially slidable movement in conjunction with the piston element 43.

FIGURE 1 shows that the backup adapter seal 41 has a counterbore 44 and annular projection 45. The counterbore 44 provides means for mounting the nose-piece holder assembly onto a gimbal ring 46 and the annular projection 45 engages the inner rounded face 36 of the inturned flange 35. The gimbal ring centers the nose-piece holder assembly and an O-ring seal 53 is provided between the adapter seal 41 and the inner face 36 of the flange 35.

The remaining elements of the self-adjusting follower assembly include the piston member 43 and a very light spring 48 in engagement therewith which tends to urge the piston in an inward direction to provide a portion of the force needed to hold the rotatable runner 15 and the stationary nose-piece 40 in operative relation.

The slidable piston 43 has an annular cylindrical portion 50 constructed to slide relative the wall of the inner seal chamber 8, and a dished-shape transverse annular element 51 connected to the piston. An axially extending flange 52 continuous with the element 51 forms an annular ring at the innermost portion of the dished-shape element 51, and in assembled position the flange 52 is disposed adjacent the axially extending annular flange 45, an O-ring 47 being provided as a seal between the elements.

This flange 52 also serves to hold the fulcrum ring 54 against which the gimbal ring 46 engages.

The gimbal ring 46 is an annular member having a rounded ridge 55 formed on the outer surface which serves to center the nose-piece holder in assembled position and permits relative movement between the gimbal ring 46 and the nose-piece holder assembly when the seal is functioning during the operation of the system in which the seal is being utilized.

As shown in FIGURES 5 and 6 the respective outer face 56 and inner face 57 of the gimbal ring 46 are provided with pivoting points in the form of V-shaped axially extending projections at 90 degrees to each other as at 58 and 59 on the outer face 56 and 60 and 61 on on the inner face 57. Projections 58 and 59 are disposed in substantially the same horizontal plane on opposite sides of the shaft 9.

Projections 58 and 59 engage the transverse face 62 of the counterbore 44 and permit the nose-piece holder assembly to swivel about the line of vertical contact. Projections 60 and 61 contact the adjacent face of the fulcrum ring 54 to permit the nose-piece holder assembly to swivel about the line of horizontal contact thus formed.

Thus the projections 58 and 59 and 60 and 61 and the rounded ridge 55 permit a universal movement of the nose-piece holder assembly and the nose-piece itself during operation.

Figure 12:
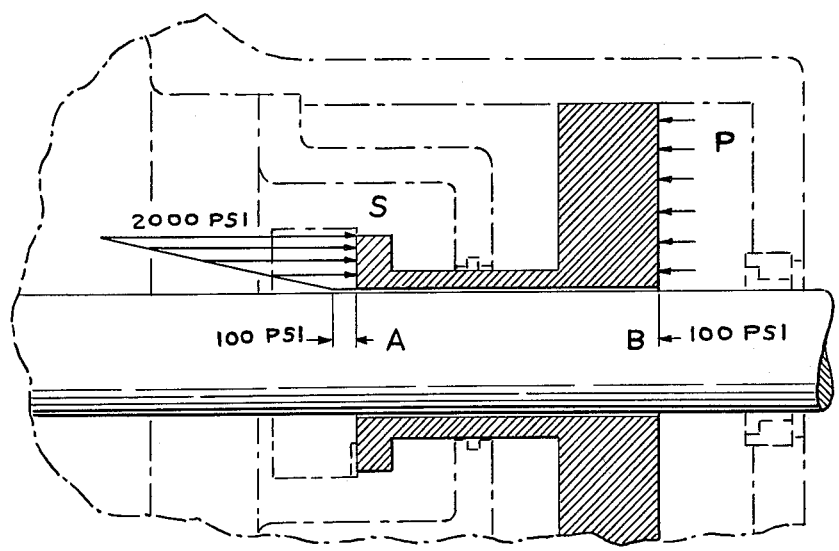
FIGURE 12 is a diagrammatic illustration of the forces acting on the follower assembly of the high pressure mechanical seal.

In assembled position high pressure fluid leaking between and acting against the interrelated faces of the runner 15 and the nose-piece 40 will produce an outwardly directed axial force designated by A in the diagrammatic differential pressure diagram of FIGURE 12. The leakage fluid, however, will pass inwardly of the nose-piece holder assembly, gimbal ring 46 and fulcrum ring 54 to the piston section P of the inner seal chamber 8 where it acts on the outer face of the transverse dished-shape member 51 of the piston to exert an inwardly directed axial force designated B in the diagrammatic differential pressure diagram of FIGURE 12.

Force A is transmitted to the piston 43 through the nose-piece holder assembly and gimbal ring 46 to the piston 43 and conversely force B acts against the outer face of the transverse member 51 of the piston to balance this force.

While the spring 48 is shown as aiding the inwardly directed force B, it actually exerts such a light force that this is negligible compared to the force exerted by the leakage fluid acting in the piston section P of the inner seal chamber 8.

If the amount of leakage from the piston section P of the inner seal chamber is now controlled, then the leakage between the interrelated faces of the runner 15 and nose-piece 40 will in turn be controlled and this will provide a predetermined fluid film thickness at static conditions which will be maintained after the seal goes into operation on rotation of the shaft because the follower assembly is self-adjusting, the forces A and B fluctuating continuously under fluctuation of the differential force effect that is produced as a result of the "run out" characteristic indicated above, for example, for the runner of a 2″ shaft.

Differential forces which provide this self-adjustment will exist between the high pressure pumped fluid acting between the respective faces of the runner 15 and the stationary nose-piece 40 and the low pressure leakage fluid acting with the spring 48 against the piston 43. At static conditions the pressure breakdown across the interrelated faces of runner 15 and nose-piece 40 are in constant balance because the spatial relationship between runner 15 and nose-piece 40 will not change. At dynamic conditions the "run out" effect of the runner 15 will cause moments of force to act on the pads 22 through 360° of the surface area of the interrelated faces of the runner 15 and nose-piece 40 which forces cause variations in the pressure exerted between the interrelated faces.

Although the surface area the high pressure fluid is acting against is relatively small as compared to that of the piston against which the low pressure acts, the effect of these variations in pressure is to produce very fine angular and axial movement of the nose-piece 40 and its associated follower assembly in the order of $150 \times 10^{-6}$ of an inch.

Since the fluid acting at the interrelated faces is in continuous communication with the leakage fluid acting on the piston 43, these variations will be transmitted proportionally and undiminished through the fluid in accordance with Pascal's law to provide the necessary self-adjustment or self-balancing of the present invention.

Thus the hydrodynamic and hydrostatic restoring moments assure substantially constant parallelism between the interrelated faces of the rotating member and the stationary member and these moment forces coact with the differential forces which serve to balance the follower assembly so that the predetermined fluid film thickness between the interrelated faces of the rotating member and the stationary member as set by controlled or limited leakage is maintained.

In the present invention, leakage from the piston section P of the inner seal chamber 8 is limited and controlled to produce the above result by an easily accessible means disposed exteriorly of the seal housing.

In the present preferred form of the invention a partition or transverse member 6 is shown between the inner seal chamber 8 and the outer seal chamber 7.

This partition is not necessary to the function of the present device but is utilized to provide means for mounting a safety device described hereinafter which acts as a safety orifice in the event the high pressure seal breaks down. However, this safety orifice which is in the order of $2 \times 10^{-3}$ of an inch for a 2″ shaft is of such great magnitude relative the external means for limiting leakage that for all purposes, the leakage fluid which reaches the piston section P will flow or pass freely inwardly of the safety device to the outer seal chamber 7, so that for the purposes of the present invention they may be considered one.

The safety orifice is represented by the annular passage 65 formed by the inner periphery of the annular ring 66 which floats freely in an annular flange 67 formed on the partition 6. A pin 68 prevents the ring 66 from rotating. When the volume of the fluid flowing through the annular passage 65 is considerably less than the volume of the annular passage the device does not restrict flow. Under normal operating conditions this will be the situation. However, where a seal failure occurs and the flow exceeds this volume, the annular passage 65 will act to throttle the flow sufficiently to permit the device on which the seal is utilized to be shut down for repair. As indicated above, this is not a necessary element to the present invention but an accessory device.

Thus, leakage fluid fills both the piston section P and the outer seal chamber 7 connected thereto by the annular passage or safety orifice 65.

Leakage System

Figure 7:
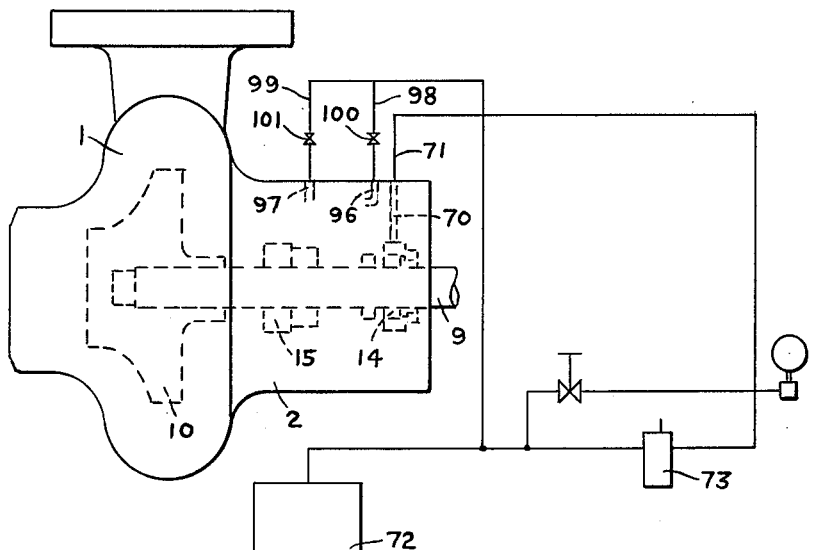
FIGURE 7 is a diagrammatic sketch of a circuit for adjusting film thickness having a fixed orifice.
Figure 8:
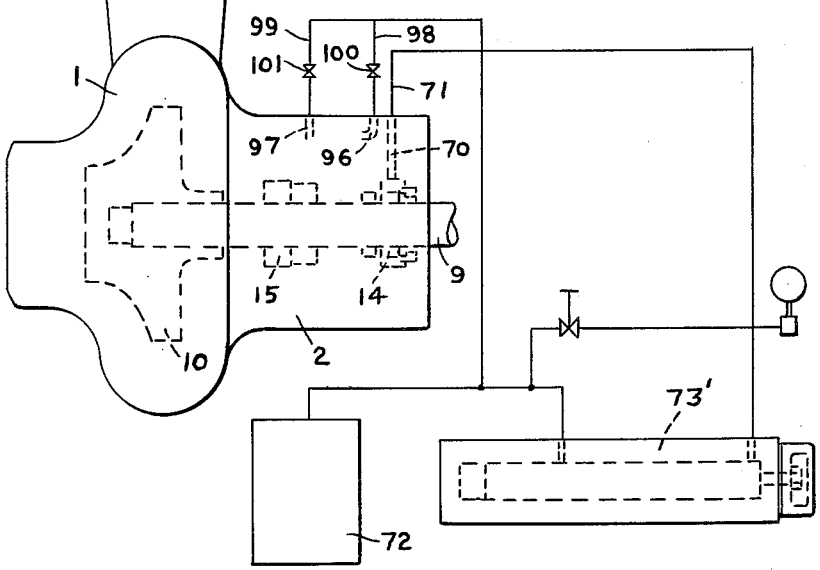
FIGURE 8 is a diagrammatic sketch of a circuit for adjusting film thickness having an adjustable orifice.

Fluid can flow from the outer seal chamber 7 through the passage 70 and conduit 71 to a drum or container 72. It can be returned from the container 72 to the system by any suitable means such as a return pump (not shown). FIGURES 7 and 8 illustrate this arrangement.

One means of controlling the quantity of fluid which is permitted to flow from the piston section and outer seal chamber 70 is a fixed type orifice means 73 disposed in conduit 71 as shown in FIGURE 7 of the drawings. A fixed orilce could of course be inserted in passage 70 as a throttling means in a similar fashion. A fixed type orifice as shown in FIGURE 7 is well known in the hydraulic art and easily purchasable on the open market and accordingly not more fully described herein.

Since the area between the respective faces of the runner 15 or 15′ as the case may be and the stationary nose-piece 40 is known, it is a mere matter of mathematics to calculate the amount of leakage which will produce the desired predetermined fluid film thickness between these elements. This in turn determines the size of the orifice required for line 71.

Variable Orifice

Another means for limiting or controlling leakage is illustrated in FIGURES 8 and 9 which show a variable orifice generally designated 73′, the remaining elements in FIGURE 8 being identical with those above described are given the same character numerals.

The variable orifice 73′ comprises a cylindrical body 80 forming a flow chamber 81 having an inlet 82 and an outlet 83. A rod element 84 has a loose fit connection with the inner wall of the flow chamber 81 and is adapted to be moved relative inlet 82 and outlet 83 by threaded element 85 disposed in the axial line of the rod and the cylindrical body 80 and having the head end 86 exposed to the exterior of the cylindrical body 80, the exterior thereof being sealed by a cap element 87 connected to this end of the body 80.

The end of the rod element 84 adjacent the inlet 82 is counterbored as at 88, and transverse ports 89 and 90 at the respective inlet and outlet end of the counterbore provide an inlet chamber and flow path for incoming fluid.

The fluid passes from the port 90 through the flow chamber 81 between the outer surface of rod element 84 and the inner wall of the cylindrical body 80 to an annular collecting chamber 91 and thence to the outlet 83 communicating therewith.

Seal 92 disposed between the inlet 82 and the outlet 83 and seal 93 disposed outwardly of the outlet 83 act to limit the flow path of fluid through the cylindrical body 80.

The nature of the flow is laminar because of the confined flow path and the degree of throttling therefore will depend on the relative length of the path.

*Low Pressure Seal*

The relatively low pressure fluid in the outer seal chamber is prevented from leaking across the shaft to atmosphere by any suitable type of conventional mechanical seal which works effectively up to 400 p.s.i.

The seal illustrated in FIGURE 1 includes the low pressure runner 14 and the stationary element 95 mounted in any suitable manner about the shaft 9 in a position to coact with the rotatable runner 14.

*Operation*

In order to place the seal into operation, it is important that fluid fill the inner seal chamber 8 and outer seal chamber 7. Accordingly in order to insure that this condition exists, passages 96 and 97 in the housing communicate with the upper or highest point in the piston chamber P of the inner seal chamber 8, where air and noncondensible gases will collect. Conduits 98 and 99 connect these passages to the reservoir or container 72 and suitable valve means 100 and 101 in these respective conduits serve to permit these chambers to be bled of this collected air and non-condensibles before the seal is placed into operation. When the seal housing is full of fluid, the shaft 9 can be placed into operation to drive the pump.

Fluid under pressure will then be forced through the runner 15 and stationary nose-piece 40 at the desired rate of leakage to form the predetermined fluid film thickness between these points.

As above described, the elements of the self-adjusting follower assembly FA are so formed as to provide the continuous movement of the stationary nose-piece 40 relative the runner 15 to maintain this desirable condition.

Should failure of any seal element occur, the increased fluid flow due to the mechanical failure will be restricted by the safety passage formed by the annular ring 66 mounted in partition 6.

It will be understood that the invention is not to be limited to the specific construction or arrangement of parts shown but that they may be widely modified within the invention defined by the claims.

What is claimed is:

1. A seal for limiting the leakage of pressure fluid across the shaft of a high pressure rotating machine in a fluid filled housing comprising:
   (a) a runner member mounted on said shaft,
   (b) a stationary seal means stationarily mounted in said housing to coact with said runner member to form a fluid film therebetween and adapted to be axially displaced and to have a swivelable movement in a plane transverse to the axis of said shaft whereby on rotation of said shaft said stationary seal means will swivel corresponding to the runout of said runner member,
   (c) a piston member operatively associated with said stationary seal means and having low pressure fluid acting thereon to balance the resultant pressure of the fluid film acting on said staionary seal means,
   (d) a gimbal means operatively disposed intermediate said piston member and said stationary seal means to permit said stationary seal means to swivel and said gimbal means to transmit axial movement between said piston member and said stationary seal means responsive to the continuous balancing of the forces acting thereon,
   (e) control means connected to said housing to limit the quantity of pressure fluid flowing across the shaft and to establish the predetermined thickness of the fluid film between said runner member and said stationary seal means.

2. The combination claimed in claim 1 wherein said stationary seal means includes a stationary seal member disposed adjacent said runner member and between which the high pressure fluid will flow in a predetermined fluid film whereby the high pressure is broken down to low pressure.

3. The combination claimed in claim 2 wherein:
   (a) a cylindrical member is transversely disposed in said housing to divide said housing into a high pressure portion and a low pressure portion with the outer periphery of said runner member and said stationary seal means defining the limits of the high pressure portion,
   (b) said stationary seal means engaging said cylindrical member in sealed and movable relationship therewith whereby said stationary seal means is permitted to be displaced axially and to swivel in a plane transverse to the axis of said shaft,
   (c) said control means connected to said housing at the lower pressure portion thereof.

4. The combination claimed in claim 3 wherein said stationary seal means, said gimbal means and said piston member coact with each other through 360 degrees to continuously balance the forces acting on said stationary seal member to permit constant parallelism between said runner member and said stationary seal member.

5. A seal for limiting the leakage of pressure fluid across the shaft of a high pressure rotating machine in a fluid filled housing comprising:
   (a) said housing having a cylindrical member transversely disposed therein to divide said housing into a high pressure portion and a low pressure portion,
   (b) a high pressure runner member mounted on said shaft in the high pressure portion of said housing and a low pressure runner member mounted on said shaft in the low pressure portion of said housing,
   (c) said high pressure runner member and said low pressure runner member being in fixed axially spaced relationship,
   (d) stationary seal means disposed about said shaft between said high pressure runner member and said cylindrical member,
   (e) said stationary seal means disposed about said shaft in sealed stationary engagement with said cylindrical member, which engagement permits said stationary seal means to move towards and away from said high pressure runner member and to swivel corresponding to the runout of said high pressure runner member,
   (f) said stationary seal means permitting fluid in the high pressure portion of said housing to create a continuous fluid film between said stationary seal means and said high pressure runner member whereby the pressure is broken down from high pressure to low pressure,
   (g) a piston assembly including a gimbal member disposed in the low pressure portion of said housing and coacting with said stationary seal means to continuously balance the forces acting thereon through 360 degrees to permit constant parallelism between said stationary seal means and said high pressure runner member.

6. The combination claimed in claim 5 wherein:
(a) said stationary seal means includes a stationary seal member disposed adjacent said high pressure runner member,
(b) said stationary seal member coacting with said high pressure runner member to break down the pressure of the fluid film therebetween from substantially 1000 p.s.i. to at least 400 p.s.i.

7. The combination claimed in claim 6 wherein control means are connected at the low pressure portion of said housing to limit the quantity of pressure fluid flowing across said shaft and to selectively establish a predetermined thickness for the fluid film between said high pressure runner member and said stationary seal means.

8. A seal for a high pressure fluid rotating machine including a shaft extending from the region of low pressure into a region of relatively high pressure comprising:
(a) a seal housing forming a seal chamber about said shaft,
(b) means defining a high pressure fluid section and a low pressure fluid section in said seal chamber,
(c) a runner member in said high pressure fluid section mounted on and rotatable with said shaft,
(d) a stationary seal means in said high pressure fluid section mounted about said shaft and disposed to coact with said runner member,
(e) holder means for said stationary seal means disposed in said high pressure fluid section about said shaft,
(f) gimbal means about said shaft connected to said holder means to center the holder means and to allow universal motion for said holder means and said stationary seal means,
(g) piston means in said low pressure fluid section operatively associated with said holder means and said gimbal means to move the holder means and said stationary seal means towards and away from said runner member responsive to differential pressure acting on said stationary seal means and said piston means,
(h) said high pressure fluid section and said low pressure fluid section being in communication with each other to permit fluid to pass in pressures varying with the relative relation of the faces of said runner member and said stationary seal means caused by the runout of said runner member whereby the pressure of the fluid acting in the low pressure fluid section will be varied in proportion thereto,
(i) said stationary seal means, said gimbal means and said piston means coacting with each other through 360 degrees to continuously balance the forces acting on said stationary seal means and to maintain substantial parallelism between the coacting faces of said runner member and said stationary seal means,
(j) conduit means forming an outlet in said low pressure fluid section of said seal chamber.
(k) means externally of said seal housing connected in said conduit means to permit and control a predetermined amount of leakage from said low pressure fluid section of said seal chamber,
(l) and the combination therewith of an auxiliary seal about said shaft a spaced distance from said low pressure fluid section to provide a zero leakage seal therefor.

References Cited in the file of this patent
UNITED STATES PATENTS

| | | |
|---|---|---|
| 2,128,744 | Hornschuch | Aug. 30, 1938 |
| 2,673,752 | Swearingen | Mar. 30, 1954 |
| 2,860,895 | Mosbacher | Nov. 18, 1958 |